March 1, 1932. T. L. FAWICK 1,847,389
FRICTION CLUTCH
Filed Dec. 30, 1929  3 Sheets-Sheet 1

Inventor
T. L. Fawick,
By Robert M. Pierson,
Attorney

March 1, 1932.  T. L. FAWICK  1,847,389
FRICTION CLUTCH
Filed Dec. 30, 1929  3 Sheets-Sheet 2

Inventor
T. L. Fawick,
By Robert McPierson,
Attorney

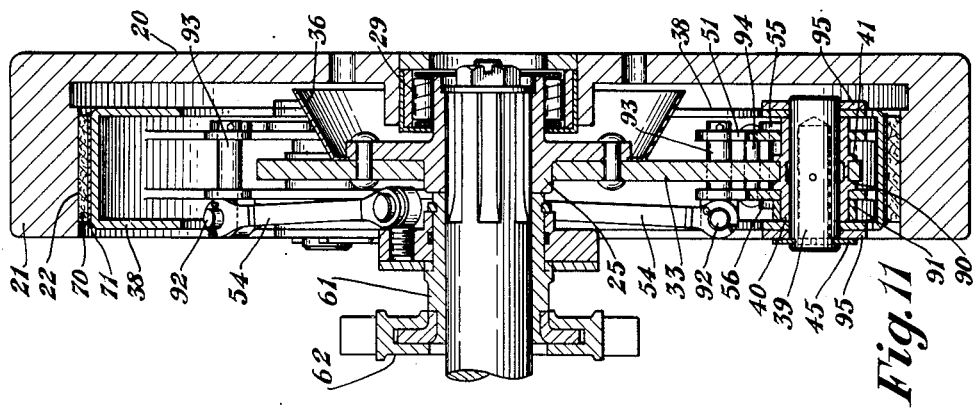

Patented Mar. 1, 1932

1,847,389

UNITED STATES PATENT OFFICE

THOMAS L. FAWICK, OF AKRON, OHIO

FRICTION CLUTCH

Application filed December 30, 1929. Serial No. 417,422.

This invention relates to friction couplings such as brakes and clutches, and mainly to those of the outwardly-acting shoe type.

Included among my objects are the reduction in cost, weight and axial length of the structure, especially as applied to a clutch, the attainment of strong holding power together with easy release at any speed, the furnishing of improved means of adjustment and the provision of a structure which may be easily assembled and taken apart.

A further and separate object is to provide for renewal of the friction shoe facings without removing the shoes from the clutch.

Radially-acting shoe clutches have an inherent advantage over those of the plate type in that the whole of the friction surfaces can be placed at a maximum distance from the center of rotation, thus affording greater driving power for a given pressure and making them particularly adaptable for transmitting heavy torques. Such clutches, however, have heretofore been more or less clumsy, heavy, expensive, difficult to maintain, lacking in full holding power, or subject to one or more other objections. In my present invention the disadvantages of the various prior examples of this type of clutch are to a large extent overcome.

This application is a continuation in part of my prior application Serial No. 399,153, filed Oct. 12, 1929.

Of the accompanying drawings, Fig. 1 is a rear elevation, partly broken away and in section, showing a friction-shoe clutch constructed according to my invention.

Fig. 3 is a detail section on the line 3—3 of Fig. 1.

Figure 1:
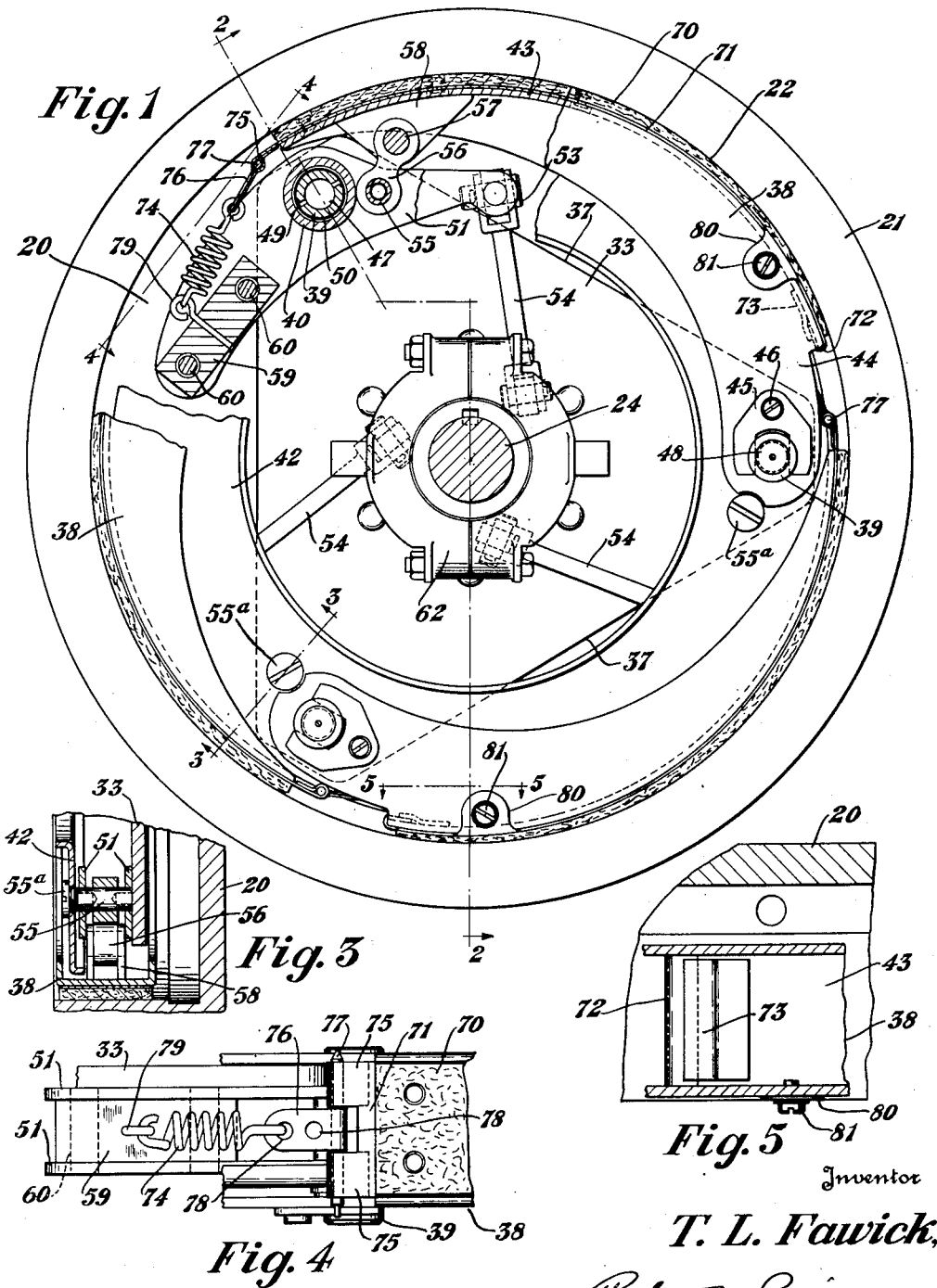

Figs. 4 and 5 are respectively a partial elevation and a partial section viewed from the planes 4—4 and 5—5 of Fig. 1.

Figure 6:
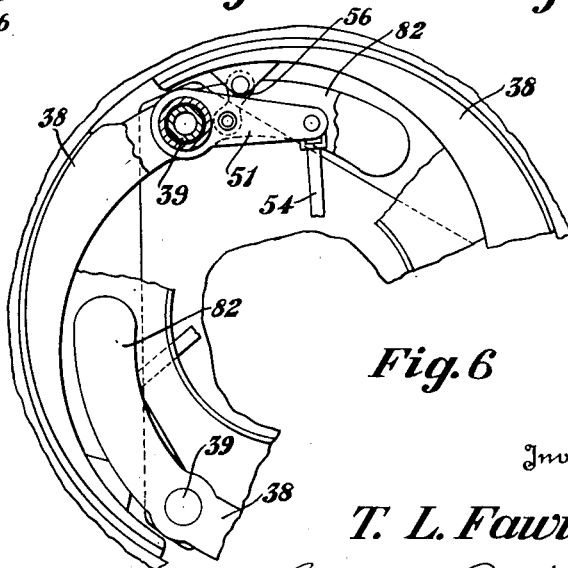

Fig. 6 is a partial rear elevation and section showing a modified counterbalancing expedient.

Figure 7:
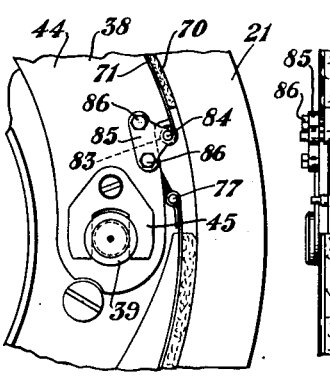
Figure 8:
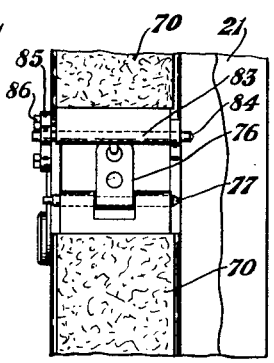

Figs. 7 and 8 are, respectively, a detail rear elevation and a detail outer-side elevation showing a modified connection of the detachable friction facing to the shoe body.

Figure 9:
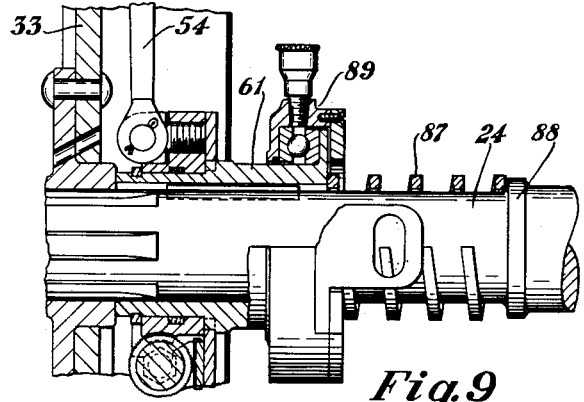

Fig. 9 is a detail axial section and elevation of a modification adapting the clutch for use with a releasing pedal opposed to a clutch-setting spring.

Figs. 10 and 11 are, respectively, a rear elevation, partly broken away and in section, and an axial section of a modification constituting the preferred embodiment of my invention.

Referring at first to Figs. 1 to 5, 20 is a driving wheel such as the fly-wheel of an engine, having a rearwardly-projecting flange 21 formed with an internal, cylindrical friction surface 22. Said wheel is formed with a central bore 23 to receive a pilot bearing hereinafter referred to. The driven parts will fit within any drive wheel properly dimensioned to receive it, and may be separately furnished as a complete unit.

24 is the driven shaft forming a part of the driven unit and having detachably fixed to its forward end, by means of splines 25, a washer and a nut 26 screwing on the end of said shaft, the hub 27 of the driven-shoe supporting plate. Said hub is made of hardened-steel to act as a journal and is formed with a forwardly-projecting tubular member 28 entering the bore 23 of the fly-wheel and rotatably supported therein by an anti-friction bearing 29, preferably of the flexible-roller type as shown, said bearing surrounding the nut 26. The case of this bearing has a force fit in the bore 23, and a ring 30 is inserted in said bore in front of the bearing to space it from the engine shaft. This construction reduces the longitudinal space occupied and also reduces the opportunity for springing of the driven shaft as compared with the usual pilot bearing at the end of the driven shaft.

Hub 27 is formed with a radial flange 31 secured by rivets 32 to the web or body-plate 33 of the shoe support, and one or more holes 34 are drilled through said body-plate and flange for oiling the pilot bearing 29. The flange of the fly-wheel is formed with radial holes 35 for the escape of excess oil, and a conical sheet-metal baffle 36 is attached to the driven-plate structure by having its inner flange held between the hub flange and the body plate, for diverting excess oil from the friction surfaces.

The shoe-supporting body-plate 33 is preferably made of thick sheet metal and is of polygonal form, having a number of straight sides 37 and truncated corners corresponding to the number of friction shoes, the plate here shown being made triangular, for three shoes. A series of these plates can be cut from a thick sheet-metal strip having a width equal to the distance between one of the sides 37 and the opposite apex or angle, the central hole and the holes for the shoe-pivot bearings and for the rivets can be punched therein, and the plate finished by a simple operation such as tumbling to remove rough edges, at a low expense. The cutting away of the plate between its angles to form substantially a polygon reduces waste in forming the plates, it reduces the amount of inertia weight in the outer regions of the rotating mass and it provides the maximum stiffness for a given amount of material in both radial and tangential directions for resisting the radial and torque pressures developed in the operation of the clutch.

I provide in this instance three circumferentially-spaced outwardly-acting friction shoes 38, each of which is pivoted at one end at one of the corners of the driven plate 33 by means of a hardened steel shaft or hinge-pin 39 journaled in a bearing sleeve 40 which projects rearwardly from the plate 33 in a horizontal direction. Each of said sleeves is shouldered and provided with a reduced portion at its front end closely fitting in an aperture in the plate and is tightly fastened to the plate by upsetting a flange 41 at the front end of the sleeve, against the front side of the plate. In this embodiment the rear ends of the bearing sleeves 40 are tightly secured in like manner to a rear sheet-metal bracing ring 42 whose inner and outer edges may be horizontally bent over in opposite directions for the sake of stiffness, this ring being spaced from the plate 33 to receive the shoe-operating devices.

The bodies of the arcuate shoes 38 are preferably formed of sheet metal, stamped and bent to form, and are of U-shaped section with an outer web 43 to which the friction facing is attached and side members or plates 44 tapering in depth from the hinged end to the free end of the shoe, each of the shoes straddling the plate 33 and ring 42.

Each of the hinge-pins 39 is formed at its outer end with opposite, parallel, tangential grooves which receive the jaws of a U-shaped retaining plate 45 removably fastened by a screw 46 to the rear side plate 44 of the shoe body, whereby said hinge-pin is detachably connected in non-turning relation to the shoe, permitting easy assembling and disconnection of the parts and causing the hinge-pin to turn in the bearing sleeve rather than in the shoe when the latter is rocked. Each hinge-pin 39 is centrally bored and the bore closed with a perforated cap 48 to form an oil reservoir 47 from which oil ducts 49 lead to the surface of the pin in registry with an annular recess 50 in the bearing sleeve 40, so that the hinge bearing may be properly lubricated by an oil supply requiring renewal only at infrequent intervals.

Externally journaled on each of the bearing sleeves 40, coaxially with the hinge-pins of the friction shoes 38, and arranged to operate the next-adjacent shoe, is a power-multiplying lever 51 located in the plane of the shoes, radially within the latter, said lever being formed with duplicate side plates spaced apart to receive the lever connections, and the rear plate being spaced from the stiffening ring 42 by a washer 52. The outer ends of the several long-arm operating portions of the levers are connected by universal pivot joints 53 with the outer ends of a series of thrust rods or links 54 for operating and adjusting the levers, and each lever has a transverse pivot pin 55 at the end of its short operating arm included in the long arm extending to the pivot joint 53, for a link 56 connecting with another pivot pin 57 located between a pair of ears 58 projecting inwardly from the arcuate wall of the shoe, the arrangement being such that the power of the thrust link 54 is multiplied upon the shoe in the ratio of about three to one. Link 56 is somewhat slanted to form a toggle with the inner portion of the lever. The link pin 55 is retained in place endwise between the shoe-supporting plate 33 and the bracing ring 42, and is withdrawable through a hole in said plate closed by a plug 55ª whose inner end is flush with the inner face of the bracing ring, the end or ends of the pin having threaded apertures to receive a drawing pin.

Each of the levers 51 is extended circumferentially beyond the end of the shoe 38, on the opposite side of its pivot from the link 56, to form a long-arm counterweight opposing the action of centrifugal force upon said shoe, a part of said counterweight being formed by a weight block 59 which is mounted between the side plates of the lever and is transversely apertured to receive retaining rods or rivets 60 having their ends mounted in holes in the lever plates.

The thrust links 54 are mounted tangent-wise of the driven shaft 24, and actuated by devices similar to those described in my aforesaid application Ser. No. 399,153. These actuating devices include a sleeve 61 splined to slide axially upon the shaft 24, a clutch-operating collar 62 rotatively coupled with a flange at the rear end of said sleeve, a ring 63 rotatably mounted on said sleeve and having oscillatory studs 64 pivoted to the inner ends of the links 54, a worm-gear segment 65 formed on the ring, and a worm 66 journaled in the ears of a bracket 67 affixed to a plate 68 which is non-rotatively connected with the sleeve 61, together with a click pawl 69, said worm having suitable means for manually turning it, such as corrugations on its periphery and a shaft end formed with holes and a hexagon head to receive a turning tool. The stems of the studs 64 are axially retained in the ring 63 by a screw-threaded formation of said stems and the walls of their apertures, the rear faces of the stud heads being slightly spaced away from the face of the ring to allow for the slight longitudinal movement of the stems which accompanies their turning movement when the clutch is being adjusted. This connection economizes space in a longitudinal direction and forms a simple retaining means for the studs.

Each of the shoes 38 is provided with a friction facing 70 of suitable material such as molded reinforced asbestos composition, and I prefer to make said facing of graduated thickness in a longitudinal direction, tapered uniformly from a minimum thickness at the end of the shoe adjacent its pivot, to a maximum thickness at the free end which receives the greatest motion and wear.

My invention further includes provision for detachably connecting the friction facings 70 with the shoe bodies 38 and removing the same from between said shoe bodies and the flange 21 of the driving wheel without removal of the shoe bodies from the clutch. To this end each friction facing 70 is riveted upon a thin sheet-metal backing strip or plate 71 of which the end for connection with the shoe body adjacent the latter's pivot is bent inwardly and laterally, forming a hook 72 to take around and under the end of the shoe web or wall 43, the lip of said hook entering a recess between said web and a retaining plate 73 which is welded to the inner side thereof. In this way the friction facing is made connectible with and disconnectible from the shoe body by an endwise movement. For maintaining the endwise engagement and holding in the opposite end of the friction facing upon the shoe body, I provide the opposite end of the backing plate 71 with a suitable anchoring device which here takes the form of a pull spring 74 and connections for attaching it to the backing plate and the weight block 59. These connections include a pair of extension ears 75 on the backing plate spaced to receive a link plate 76 and apertured for a removable hinge pin 77 having a slightly reduced waist which passes through an eye in said link plate, one end of the spring 74 being hooked through one of a pair of holes 78 in the link plate and being transferable to the other hole if it is desired to shorten the connection. The connection of the spring with the weight block 59 is formed by hooking the outer end of the spring into a ring 79 anchored in said weight block. As an additional means for retaining the friction facing on the shoe body, I have shown its backing plate 71 formed with an inwardly-turned side ear 80 detachably secured by a screw 81 to the side plate 44 of the shoe body.

Figure 2:
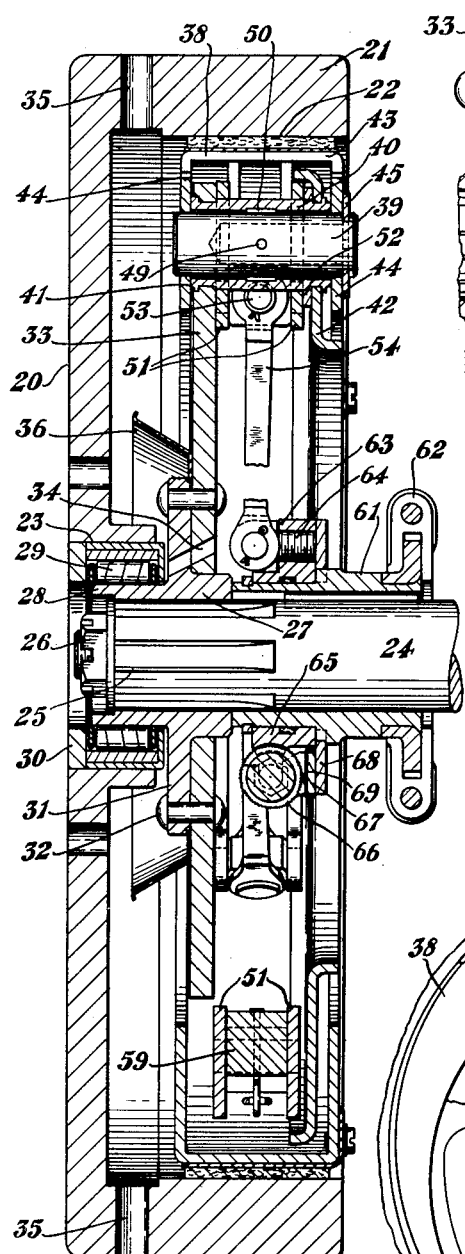
Fig. 2 is a section thereof on the line 2—2 of Fig. 1.

In the operation of this form of my invention, the levers 51 are rocked to project the shoes 38 outwardly against the friction surface 22 on the driving wheel by moving the sleeve 61 forwardly along the driven shaft 24 to bring the parts into the position represented in Fig. 2, in which position the inner ends of the thrust links 54 are carried slightly over center so that the shoes will be locked in their engaged position. The levers 51 in conjunction with the thrust links and operating sleeve afford a very powerful engagement of the friction shoes so that heavy torques can be transmitted. Reversal of the movement of said sleeve releases the shoes, and the action of the springs 74 carries them slightly away from the wheel surface and insures against the shoes dragging against said surface. When it is desired to adjust the initial positions of the shoes in their released condition, this may be effected by turning the ring 63 on sleeve 61 by means of the worm 66 to move the thrust links 54 endwise while swinging them in planes transverse to the axis of shaft 24. Upon release of the clutch and while the driven shaft and connected parts are still rotating, the effect of centrifugal force upon the shoes is counteracted by means of those parts of the levers, including the weight blocks 59, which extend counter-clockwise beyond the lever pivots as viewed in Fig. 1, this counterweighting action being mutiplied upon the shoes by reason of the greater length of the counterweighting arm as compared with the distance between the pivots 39 and 55. The counterweighting further insures an easy release of the shoes at any speed. Should it be necessary to renew the friction facings, they may be removed without removal of the shoes by pulling out the pins 77, removing the screws 81, moving the clutch facings endwise to disconnect their hooked ends 72 from the shoe bodies and withdrawing the facings rearwardly from between said shoe bodies and the fly-wheel flange 21.

In the modification represented in Fig. 6, in place of counterweighting the levers 51, each of the shoes 38 is provided with an extension 82 on the opposite side of its pivot 39 to form a counterweight rigid with said shoe.

In Figs. 7 and 8, I have shown a modified attachment at one end of the friction facing 70 in place of the hook 72, which consists in forming an eye 83 on the end of the backing strip 71, to receive a rearwardly-removable anchoring pin 84 projecting from a plate 85 which is detachably secured by screws 86 to the rear side plate of the shoe body.

Fig. 9 illustrates a modified embodiment including a spring 87 interposed between the clutch-operating sleeve 61 and a shoulder 88 on the driven shaft, for use in connection with the usual ball-bearing thrust collar 89 adapted to be operated by a pedal lever in accordance with the common practice in automobile installations. Any other suitable clutch-engaging spring arrangement could be employed in this modification.

In the preferred embodiment of my invention illustrated in Figs. 10 and 11, a single plate 33, attached to a hub 25 in the manner previously described, and serving to support the friction shoes and their operating levers, is mounted in a plane approximately midway of the driving friction surface 22 on the flywheel. Bearing sleeves 40 for the shoe pivots 39 are mounted at their middle portions transversely in holes at the angles of the plate 33, and securely fastened to said plate by means of shoulders 90 and 41 on the sleeve, the latter of which is upset after assembling. The shoes 38 in this case straddle the plate 33 with an even or balanced spacing on each side, and the levers 51, having the operating ends of their side plates connected by rivet pins 94, also straddle said plate but are offset forwardly from the middle plane and their rear plates held by spacing sleeves 91 against the bearing-sleeve shoulders 90, the outer ends of the thrust links 54 being in this case pivoted by pins 92 in the heads of pivot pins 93 which are mounted to turn in the ends of the levers and detachably held thereon. In this embodiment I have shown reinforcing plates 95 surrounding the ends of the shoe pivot pins 39 and adapted to be welded to the outer facings of the shoe side plates. The remaining features are or may be of the same construction and mode of operation as in Figs. 1 to 5 inclusive. This form of my invention is somewhat simpler and cheaper to manufacture than the first described embodiment.

Various other modifications could be made and features added or omitted without departing from the scope of my invention as defined in the claims.

I claim:

1. In a friction clutch, the combination of driving and driven members having coacting friction devices, and a pivoted element for engaging and releasing said devices, said element having a swinging operating movement in one plane and a swinging adjusting movement in a different plane.

2. In a friction clutch, the combination of coacting friction devices, and a pivoted member having a swinging and endwise movement in a plane substantially parallel with the axis of rotation of the clutch for causing engagement and release of said devices, and also having a swinging and endwise movement in a plane transverse to said axis for adjusting the initial clearance between said devices.

3. In a friction clutch, the combination of a driven member having friction elements, radiating members having separate movements in different planes for operating and adjusting said elements, and central controlling means having sliding and rotary movements respectively for imparting the operating and adjusting movements to said radiating members from their inner ends.

4. In a friction clutch, the combination of a driving wheel, a driven shaft, friction members for connecting the two, radiating elements having separate movements in different planes for operating said friction members and adjusting their initial clearance, a sleeve slidable along said shaft for imparting the operating movement, a ring on said sleeve for imparting the adjusting movement, and manual means for relatively rotating said sleeve and ring.

5. In a friction clutch, the combination of a driving wheel, a driven shaft, friction members for connecting the two, connecting devices having separate movements in different planes for operating and adjusting said friction members, and means slidable along said shaft for imparting the operating movement, said means including a worm and worm-gear mechanism for imparting the adjusting movement to said connections.

6. In a friction clutch, the combination of driving and driven members, friction elements for connecting the two, and centrally located means including a support having worm bearings inwardly open in a radial direction, a worm mounted therein transversely of the axis of rotation of the clutch, and a worm gear, for adjusting the initial clearance of said friction elements.

7. In a friction clutch, the combination of friction devices, and connections including members having swinging movements in two planes respectively for operating said devices and adjusting their initial clearance, means for separately performing the respective swinging movements and universal pivot joints at the ends of said members.

8. In a friction clutch, the combination of a driving wheel, a driven member and shaft, friction shoes carried by said driven member, thrust links having a longitudinal swinging movement for operating said shoes and a transverse swinging movement for adjusting them, and means embracing said shaft and movable longitudinally thereof for imparting the longitudinal swinging movement, said means including a relatively rotatable element for imparting the transverse swinging movement to said links.

9. In a friction clutch, the combination of a driving wheel, a driven member and shaft, friction shoes and operating levers therefor carried by said driven member, swinging thrust links connected with said levers, a sleeve slidable longitudinally of the driven shaft for longitudinally swinging said links to operate the levers and shoes, and an adjusting ring mounted on said sleeve and rotatable thereon for transversely swinging said thrust links to adjust the initial clearance of the shoes.

10. In a friction clutch, the combination of a friction device, and means including an actuator, a universal pivot member having an oscillating screw-thread connection with said actuator for retaining it endwise thereon, and connections from said member for operating and adjusting said friction device.

11. A driven unit for friction clutches comprising a driven-shoe support, an outwardly-acting friction shoe pivoted thereon, and a power-multiplying, shoe-operating lever pivoted on said support and having a counterweight for opposing the action of centrifugal force upon said shoe.

12. A driven unit for friction clutches comprising a driven-shoe support, an outwardly-acting friction shoe pivoted thereon, and a power-multiplying lever linked to said shoe and having a counterweight extending circumferentially beyond the shoe.

13. A driven unit for friction clutches comprising a driven-shoe support, a radially-acting friction shoe pivoted thereon, a thrust member, and a shoe-operating lever pivoted on said support and having a short-arm connection with said shoe, a long-arm connection with said thrust member and, opposite to the latter connection, a long-arm counterweight adapted substantially to counterbalance the clutch-engaging action of centrifugal force upon said shoe and its operating connections.

14. A driven unit for friction clutches comprising a driven-shoe support, an outwardly-acting friction shoe pivoted at one end thereon, a shoe-operating lever pivoted on said support in the plane of the shoe at a point radially inward from the latter and having a counterweight adapted substantially to counterbalance the opposed effective mass of the shoe, lever and connections against the action of centrifugal force, and a link connecting the shoe with the lever at a point on the latter on the opposite side of its pivot from said counterweight.

15. A driven unit for friction clutches comprising a driven-shoe support, a friction shoe mounted thereon, a shoe-operating lever pivoted on said support and comprising a pair of spaced side plates, a counterweight fastened between said plates, and a link mounted between said plates and connecting the lever with said shoe.

16. A driven unit for friction clutches comprising a driven-shoe support, a circumferential series of friction shoes pivoted thereon, and an operating lever for one of said shoes, pivoted on said support coaxially with the pivot of the adjacent shoe and having a counterweight substantially balancing the clutch-engaging tendency produced by the action of centrifugal force upon the first-said shoe and its operating connections.

17. A driven unit for friction clutches comprising a driven-shoe support, a bearing sleeve fixed thereon, a friction shoe having a pivot shaft journaled in said sleeve, an adjacent friction shoe, and an operating lever for said adjacent shoe, externally pivoted on said sleeve.

18. A driven unit for friction clutches comprising a driven shaft, an attached driven-shoe support having a fixed bearing, a friction shoe, a pivot-shaft for said shoe journaled in said bearing, and means detachably holding said shaft in non-turning relation to said shoe.

19. A driven unit for friction clutches comprising a driven shaft, an attached driven-shoe support having a fixed bearing, and an outwardly-acting friction shoe of U-shaped section straddling said support and pivoted thereon by a pin fixed to the shoe and turning in said bearing.

20. A driven unit for friction clutches comprising a driven-shoe support, a bearing sleeve fixed thereon, an outwardly-acting friction shoe of U-shaped section straddling said support, a pivot-shaft for said shoe journaled in said sleeve, and a shaft-retaining plate detachably fixed to the side of said shoe and having a non-turning connection with said shaft.

21. A driven unit for friction clutches comprising a driven-shoe support having a shoe-pivot bearing fixed thereon, a pivot pin in said bearing, projecting at opposite ends therefrom, and a friction shoe having side members detachably engaging the projecting ends of said pivot pin on opposite sides of said support at one end of the shoe and held in non-turning relation to the pin.

22. A driven unit for friction clutches comprising a driven-shoe support, a shoe-operating lever pivoted on and straddling said support, and a friction shoe mounted on said support and actuated by said lever.

23. A driven unit for friction clutches comprising a driven-shoe support, a series of outwardly-acting friction shoes pivoted on and straddling said support, and a series of shoe-operating levers straddling said support and each pivoted thereon coaxially with the lever next adjacent to the one which it operates.

24. A driven unit for friction clutches comprising a hub, a polygonal, flat plate fastened thereto, bearing sleeves transversely fixed in apertures in said plate at the angles thereof, and a series of outwardly-acting friction shoes pivoted in said sleeves.

25. A friction clutch comprising a centrally-apertured driving member, a driven shaft, friction devices for connecting the two, and a separately-formed support for said devices, mounted on the shaft and having a hub provided with a portion entering the aperture in said member and having a pilot bearing therein.

26. A friction clutch comprising a centrally-apertured driving wheel, a driven shaft, a shoe-supporting plate thereon, a plate-retaining nut on said shaft, a friction shoe on said plate coacting with the driving wheel, a hub member on said plate, projecting forwardly into the aperture in said wheel and a pilot bearing surrounding said nut, for rotatably supporting said hub in the driving wheel.

27. A friction coupling comprising relatively rotatable inner and outer members, one of which includes a shoe body, and a facing on said body for frictionally engaging the other member, said facing having a medial end connection disconnectible from the shoe body by a relatively short movement endwise thereof and being then removable bodily by a lateral movement from between said other member and the shoe body without removing the latter.

28. A friction-clutch shoe comprising an arcuate shoe body, an arcuate facing having detachable engagement therewith at one end, and a pull connection at the other end, including a spring.

29. A driven unit for friction clutches comprising a driven-shoe support, a friction-shoe body mounted thereon, a friction facing detachably connected at one end with said body, and yielding shoe-releasing means connected with the other end of said facing.

30. A driven unit for friction clutches comprising a driven-shoe support, an outwardly-acting friction-shoe body pivoted at one end thereon, a counterweighted shoe-operating lever pivoted on said support, a friction facing detachably connected at one end with said shoe body, and a shoe-releasing pull spring connecting the other end of said facing with the shoe-operating lever.

In witness whereof I have hereunto set my hand this 27th day of December, 1929.

THOMAS L. FAWICK.